(12) United States Patent
Wilhelmsson et al.

(10) Patent No.: US 7,894,540 B2
(45) Date of Patent: Feb. 22, 2011

(54) METHOD AND APPARATUS FOR REDUCING PHASE NOISE IN ORTHOGONAL FREQUENCY DIVISION MULTIPLEXING SYSTEMS

(75) Inventors: Leif Wilhelmsson, Dalby (SE); Fredrik Nordstrom, Lund (SE); Niklas Andgart, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 686 days.

(21) Appl. No.: 11/877,894

(22) Filed: Oct. 24, 2007

(65) Prior Publication Data

US 2009/0110112 A1   Apr. 30, 2009

(51) Int. Cl.
 *H04L 27/28* (2006.01)
(52) U.S. Cl. .......................... 375/260; 375/222; 375/267
(58) Field of Classification Search ................. 375/222, 375/260, 267
See application file for complete search history.

(56) References Cited

U.S. PATENT DOCUMENTS

| 2002/0064240 | A1 | 5/2002 | Joshi et al. | |
| 2005/0078599 | A1* | 4/2005 | Zhidkov et al. | 370/210 |
| 2008/0002652 | A1* | 1/2008 | Gupta et al. | 370/338 |
| 2010/0014498 | A1* | 1/2010 | Trachewsky | 370/338 |

FOREIGN PATENT DOCUMENTS

EP   1 724 941 A1   11/2006

OTHER PUBLICATIONS

V.S. Abhayawardhana, et al., "Common Phase Error Correction with Feedback for ODFM in Wireless Communication," Laboratory for Communicalions Engineering, Dept. of Engineering, University of Cambridge, UK.

* cited by examiner

*Primary Examiner*—Chieh M. Fan
*Assistant Examiner*—Freshteh N Aghdam
(74) *Attorney, Agent, or Firm*—Roger S. Burleigh

(57) ABSTRACT

Method and apparatus for reducing phase noise from a multi-carrier modulation (MCM) system, such as an orthogonal frequency division multiplexing (OFDM) system, by transmitting known data on a sub-carrier at a power level adapted to allow for accurate estimation. Preferably, the sub-carrier is the DC sub-carrier.

13 Claims, 6 Drawing Sheets

METHOD AND APPARATUS FOR REDUCING PHASE NOISE IN ORTHOGONAL FREQUENCY DIVISION MULTIPLEXING SYSTEMS

BACKGROUND

The present invention relates generally to communication systems and, more particularly, to wireless communication systems adapted to use Orthogonal Frequency Division Multiplexing (OFDM) modulation techniques. As used herein, the abbreviations set forth below shall have the meanings adjacent thereto:

3G LTE Third Generation Long Term Evolution
CPE Common Phase Error
ICI Inter Carrier Interference
IF Intermediate Frequency
FDM Frequency Division Multiplexing
FFT Fast Fourier Transform
LTE Long-Term Evolution
LO Local Oscillator
MCM Multi-Carrier Modulation
OFDM Orthogonal Frequency Division Multiplexing
PNL Phase Noise Level
WLAN Wireless Local Area Network Multi-Carrier Modulation (MCM) is the principle of transmitting data by (i) dividing the stream into several parallel bit streams, each of which has a much lower bit rate, and (ii) using these substreams to modulate several carriers. The first systems using MCM were military HF radio links in the late 1950s and early 1960s. Orthogonal Frequency Division Multiplexing (OFDM), is a special form of MCM with densely spaced sub-carriers and overlapping spectra. OFDM abandoned the use of steep bandpass filters that completely separated the spectrum of individual sub-carriers, as was common practice in older Frequency Division Multiple Access (FDMA) systems. Rather, OFDM time-domain waveforms are chosen such that mutual orthogonality is ensured even though sub-carrier spectra may overlap. OFDM relies on the insight in communications provided by Shannon, in particular, in his "geometric" theory, considering waveforms to be a point in a Euclidean space, allowing definitions of orthogonality. OFDM multiplexes signals by dividing the available bandwidth into a series of frequencies known as sub-carriers. In OFDM, the data is transmitted on a large number of orthogonal sub-carriers, where the frequency separation between the sub-carriers equals the reciprocal of the duration of an OFDM symbol. OFDM achieves high performance with reasonable complexity at the receiver.

Evolving mobile cellular standards such as WiMAX, WLAN, and 3G Long Term Evolution (3G LTE) will likely require modulation techniques such as OFDM in order to deliver higher data rates. An advantage of OFDM is its inherent robustness to time-dispersive channels, as the duration of an OFDM symbol can be made large even when the supported data rate is high.

In order for OFDM to work properly, however, it is important that the different sub-carriers that are orthogonal when transmitted also are orthogonal at the receiver. There are a number of reasons why the sub-carriers will no longer be perfectly orthogonal at the receiver. When the sub-carriers are no longer orthogonal at the receiver, information transmitted on the sub-carrier to some extent interferes with the adjacent sub-carriers. This interference is commonly referred to inter-carrier interference (ICI).

ICI may occur because the channel is varying due to the movement of the transmitter, receiver, or both. ICI may also occur due to imperfections at both the transmitter and the receiver. One such imperfection is frequency error based on an offset between the transmitter and the receiver. Frequency error can often be made sufficiently small if the frequency can be estimated for a sufficient period of time. Another imperfection is phase noise. As opposed to a frequency error, which can be considered static, the phase noise changes from one OFDM symbol to the next. In fact, for OFDM systems the degradation due to phase noise is sometimes addressed by dividing it into two parts, one that is caused by the low-frequency part, and one which is caused by the high frequency part. The border between the low frequency and high frequency equals half the sub-carrier spacing.

Heterodyne receivers include a mixer in the receiver chain to convert the incoming high frequency RF signal to an intermediate frequency (IF), where much improved selectivity is possible. A local oscillator (LO) is required to implement this design. The difference between the LO frequency and input signal frequency produces the desired IF. By making the IF a fixed frequency and tuning the LO to select a given channel, the IF selection filter and additional amplification can be carefully optimized for good selectivity with small size and low cost. A special case of the heterodyne receiver is the zero IF receiver, also known as the homodyne receiver, where the LO coincides with the incoming carrier frequency giving an IF of zero Hz. This is also called a direct conversion receiver.

Because the signal in a zero IF design is mixed down to about zero Hz, quadrature versions of the signal must be generated in order to allow the detector to differentiate between in-band components above the LO frequency and those below the LO frequency.

In a direct conversion receiver, there are few image problems, and the IF selection filter becomes a pair of low pass filters at baseband. This allows the filter to have even greater selectivity with better gain and phase response. Direct conversion receivers are often used in conjunction with a digital signal processor to implement the channel filtering and data detection. In this case, the two baseband analog outputs from the mixers are digitized using A/D converters. The advantage of using DSP to implement channel filtering is that near perfect gain and phase response can be realized with very high order (highly selective) filters with variable passband. This in turn means that the channel spacing can be changed under software control.

There are several disadvantages with direct conversion receivers. The first is the problem of local oscillator re-radiation from the antenna, as the LO, which is at the frequency of the incoming signal, may leak back through the front end mixer/amplifier/filter chain. A second disadvantage is DC-offset within the two baseband signals which, if present, can corrupt wanted information that has been mixed down around zero Hz. Causes of DC-offset are either drift in the baseband components, or DC from the mixer output caused by the LO mixing with itself or with the mixers acting as square law detectors for strong input signals As noted above, in a zero-IF receiver, the received signal is directly down-converted from the carrier frequency to a baseband frequency, without an intermediate step where the signal is processed at an IF. This allows for a considerably lower manufacturing cost, but it is also known to suffer from problem with DC-leakage. DC-leakage occurs primarily because the carrier frequency generated at the receiver for down-mixing the signal, leaks into the receiving signal, and via the mixer results in a DC component.

In case of OFDM, the problem of DC leakage can be minimized by avoiding or nulling transmission of information on the DC sub-carrier of the OFDM signal. This means that a very small fraction of the available sub-carriers is not used, and therefore the reduction in the transmitted data rate is very small. In the event there is no frequency error, the DC component generated in the receiver will be orthogonal to the other sub-carriers. Hence, the other sub-carriers are not affected by the DC offset. However, in case of frequency offset, the sub-carriers will be frequency shifted by an amount corresponding to the frequency offset before being processed by the FFT. In this way the different sub-carriers are located properly, but the DC component generated in the receiver after the frequency correction is located at a frequency equal to the estimated frequency, but with the opposite sign.

There are currently two approaches for dealing with the low frequency part of the phase noise, sometimes referred to as the common phase error (CPE). Either, stringent design requirements are placed on the frequency synthesizer, or a number of pilot symbols on specific sub-carriers are transmitted on every OFDM symbol, so that the CPE can be estimated and subtracted from the received signal. The former approach requires that rigorous requirements be placed on the frequency generating circuitry, whereas the latter approach requires that part of the available bandwidth is not used for transmitting user data, so that the data rate possible to support is reduced.

Consequently, there is a need for a way to estimate the CPE and remove it so that the requirements on the frequency generating circuitry can be as relaxed as possible. On the other hand, there is a need for bandwidth efficient transmission, so that the CPE should be estimated without transmitting a large number of pilot symbols, that effectively only are used for estimating the CPE.

It would be advantageous to have a method and apparatus to estimate the CPE and remove it so that the requirements on the frequency generating circuitry can be as lenient as possible. On the other hand, it would be advantageous to have a method and apparatus for bandwidth efficient transmission, so that the CPE can be estimated without transmitting a large number of pilot symbols. The present invention provides such a method and apparatus.

SUMMARY

The present invention is a method and apparatus of transmitting a pilot symbol on the DC sub-carrier, such that it does not cause noticeable ICI on the adjacent sub-carriers, and using the pilot symbol for estimating the CPE. Since the DC sub-carrier is only one carrier among typically several hundreds of sub-carriers, the reduction in data rate will be minimal. Further, the power of the DC sub-carrier can be adaptively updated so that it is just strong enough to allow for the CPE to be accurately estimated without using an excess of the total available power. Finally, the pilot symbol sent on the DC sub-carrier preferably does not include a DC component so that the system and apparatus of the present invention remain functional even if a DC-blocker is used.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

The present invention is described herein using several specific numerical parameters. The use of these specific parameters is made solely to illustrate the many teachings of the present invention. The scope of patented subject matter is not limited to the use of any of such specific numerical parameters.

To illustrate the present invention, it is assumed that the sub-carrier spacing is 15 kHz, as used in 3G LTE, and that the size of the FFT and the IFFT is 2048. In 3G LTE, the largest bandwidth (BW) available is 20 MHz, and the corresponding number of sub-carriers is 1201. Of these sub-carriers, 1200 are used for carrying user data or reference symbols, whereas the DC sub-carrier is null, as herein-before described.

Figure 1:
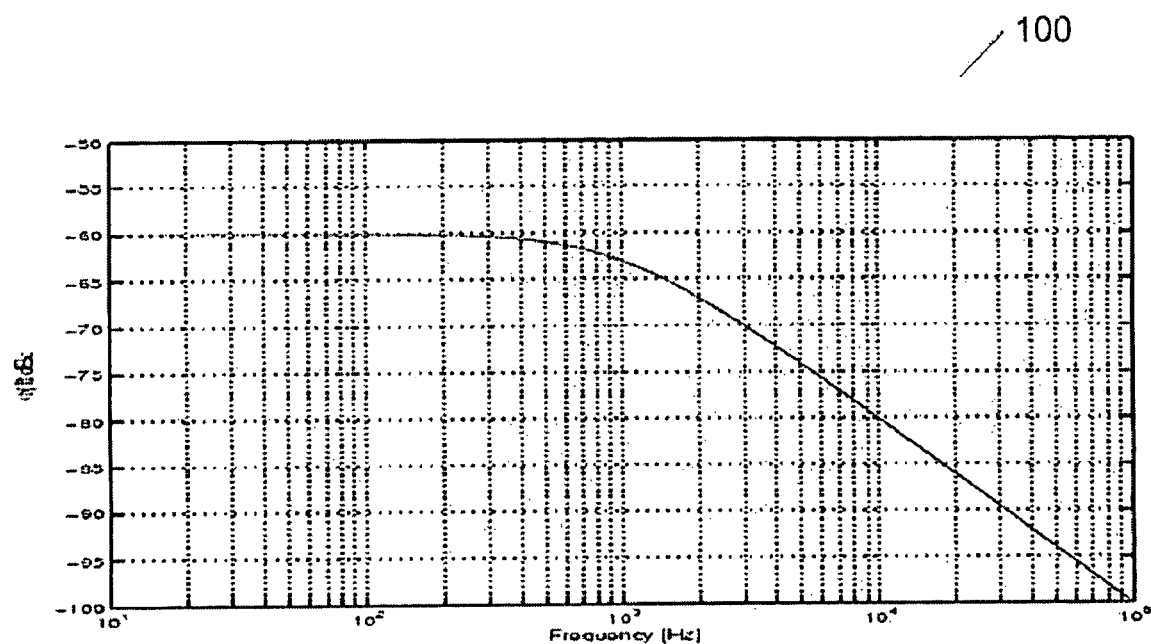
FIG. 1 is a graph illustrating the typical power spectral density of phase noise.

Assume the power spectrum density of the phase noise is given by the expression $PNL/(1+(f/fc)^2)$.

Where PNL is the phase noise level at DC in dBc/Hz, and fc is the cut-off frequency. FIG. 1 is a graph 100 illustrating the power spectral density of the phase noise where PNL=−60 dBc/Hz and $f_c$=1 kHz. The power of the phase noise can be calculated by integrating the phase noise of the entire frequency band. Using the simple model for the phase noise above, it follows that the power of the phase noise equals:

$$\sigma_{PN}^2 = \int_{-\infty}^{\infty} \frac{PNL}{1+(f/f_c)^2} df = \pi PNL f_c.$$

Figure 2:
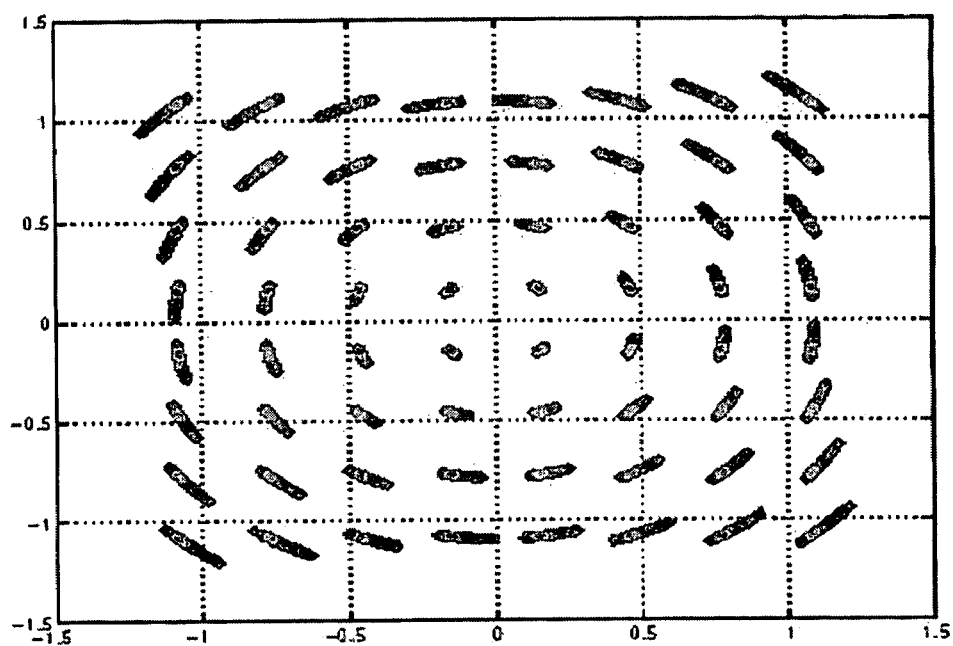
FIG. 2 is an IQ diagram illustrating the effect of phase noise using a signal constellation.

Referring now to FIG. 2, an example of how the phase noise might affect the received signal is provided where the modulation used is 64-QAM. IQ diagram 200 of FIG. 2 illustrates the effect of phase noise using a signal constellation. In the graph 200 of FIG. 2, the power of the phase noise is −35 dBc. Moreover, there is no thermal noise, so that the effective SNR becomes 35 dB.

In FIG. 2, the distortion is almost completely in the phase domain, and there is almost no error seen in the amplitude domain. While the foregoing is not necessarily the case for an OFDM system, it typically is. To analyze the effect of phase noise on an OFDM signal, suppose that the phase error is relatively small:

$$e^{j\phi(t)} \approx 1 + j\phi(t).$$

The average phase change during an OFDM symbol will then be given by:

$$\phi_0 = \frac{1}{T_u}\int_0^{T_u} \phi(t) dt.$$

where Tu is the duration of one OFDM symbol in seconds.

As can be seen, the phase change does not depend on which one of the sub-carriers that is considered; it is common for all sub-carriers. Hence, it is denoted Common Phase Error (CPE). The power of the CPE can be calculated as follows:

$$\sigma_0^2 = \int_{-\infty}^{\infty} \mathrm{sinc}^2(f/f_u)|\Phi(f)|^2 df,$$

where $$f_u = 1/T_u.$$

Just as the effect of the low frequency part can be calculated, the effect of the high frequency part can be similarly calculated as follows:

$$\phi_m = \frac{1}{T_u}\int_0^{T_u} \phi(t) e^{jm2\pi f_u t} dt \text{ for sub-carrier } m$$

with the corresponding power as follows:

$$\sigma_m^2 = \int_{-\infty}^{\infty} \mathrm{sinc}^2(f/f_u)|\Phi(f - mf_u)|^2 df.$$

The foregoing illustrates that the effect of the phase noise now is different for different sub-carriers, thus making it much harder to estimate. In fact, the high frequency part of the phase noise will cause ICI which is hard to remove. The total power of the ICI can be calculated as follows:

$$\sigma_{ICI}^2 = \sum_{m \neq 0} \sigma_m^2.$$

The present invention is adapted with reducing, and ideally removing, the effect of the CPE. Based on the observation that the CPE is the same for all sub-carriers within one OFDM symbol, it follows that it can be estimated if there is one or several known symbols transmitted in every OFDM symbol. Suppose that 1200 sub-carriers are used and that all are transmitted at the same power. Moreover, suppose that in order to estimate the CPE sufficiently accurately, 20 sub-carriers are needed. In the case where 100 Mbit/s is supported and all 1200 sub-carriers are used, then these 20 sub-carriers correspond to a reduction in data rate by more than 1.5 Mbit/s. Thus, the present invention is directed to an apparatus and method of transmitting known data on one sub-carrier, but transmitting this known data at considerably higher power in order to allow for accurate estimation. Moreover, since the DC sub-carrier is typically null, the present invention is adapted to use this sub-carrier for transmitting the known data.

Figure 3:
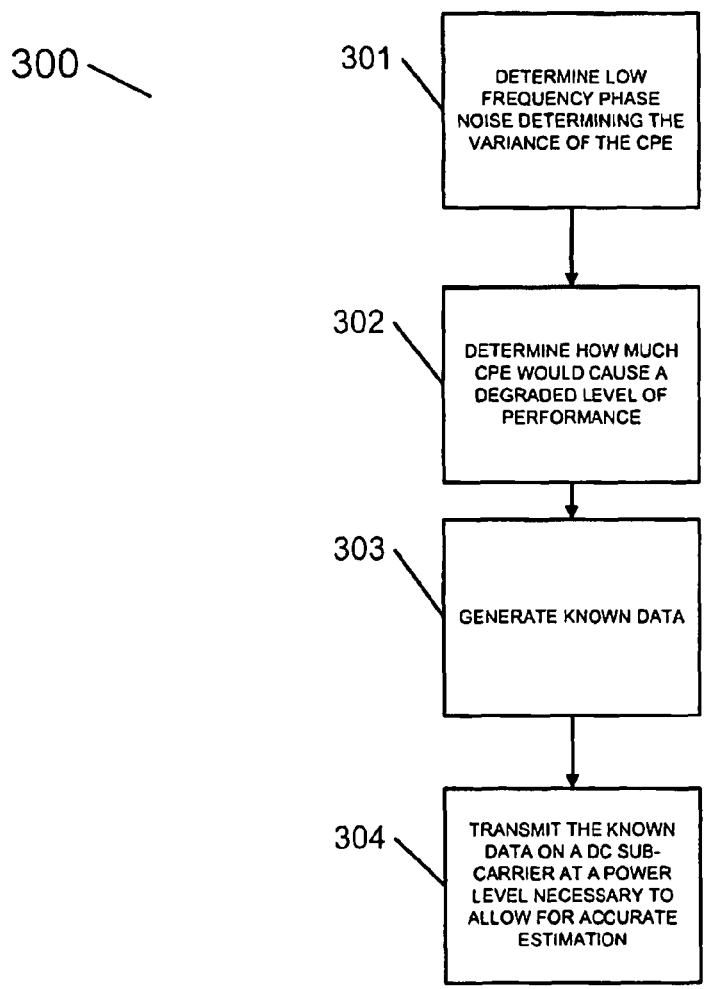
FIG. 3 is a flow chart illustrating the method of an embodiment of the present invention.

FIG. 3 sets forth a flow chart 300 illustrating an embodiment of the present invention. As seen therein, in step 301, low frequency phase noise is determined by determining the variance of the CPE. In step 302, a determination is made of how much CPE would cause a degraded level of performance. In step 303, known data is generated. In step 304, the known data is transmitted on a DC sub-carrier at a power level necessary to allow for accurate estimation.

Figure 4:
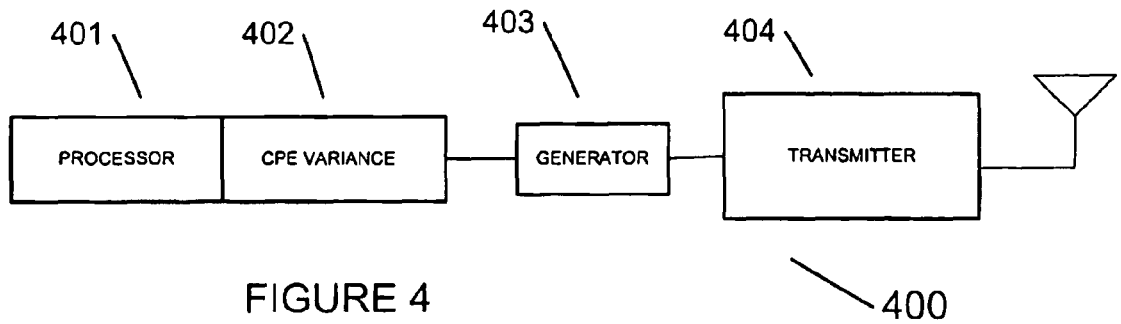
FIG. 4 is a block diagram of an embodiment of the present invention.

FIG. 4 sets forth a block diagram illustrating an apparatus embodiment 400 of the present invention. As seen therein, a processor 401 is adapted to determine how much CPE would cause an unacceptable level of degraded performance. Low frequency phase noise is determined using a means 402 adapted to determine the variance of the CPE. A generator 403 is adapted to generate known data. The known data is transmitted by transmitter 404 which is adapted to transmit the known data on a DC sub-carrier at a power level necessary to allow for accurate estimation.

Optimizing the available transmit power for CPE estimation and compensation depends on two variables: (i) the level of the low frequency phase noise, in other words, the amount of variance of the CPE and (ii) the amount of CPE that is acceptable, that is the amount of CPE that does not overly degrade performance. The latter depends primarily on the modulation used, but also, to some extent, on the power of the coding.

FIGS. 5 to 11 provide some qualitative examples under what circumstances it is beneficial to estimate and subtract the CPE. Note that some of these simulations were performed using the above referenced parameters. In these Figures, the effective SNR is compared for three different case. The SNR is defined as the power of the desired signal divided by the variance of the thermal noise plus the phase noise. The three cases are as follows: (1) when no countermeasure is taken to reduce the impact of the CPE; (2) when the CPE is perfectly estimated and subtracted, and (3) when the CPE is estimated using the DC sub-carrier and then subtracted. On the x-axis of each of the graphs of FIGS. 5 to 11, the power offset of the DC sub-carrier to the average power of the data sub-carriers is given. This can be used to obtain an indication of how much power is needed in order to accurately estimate the CPE.

Figure 5:
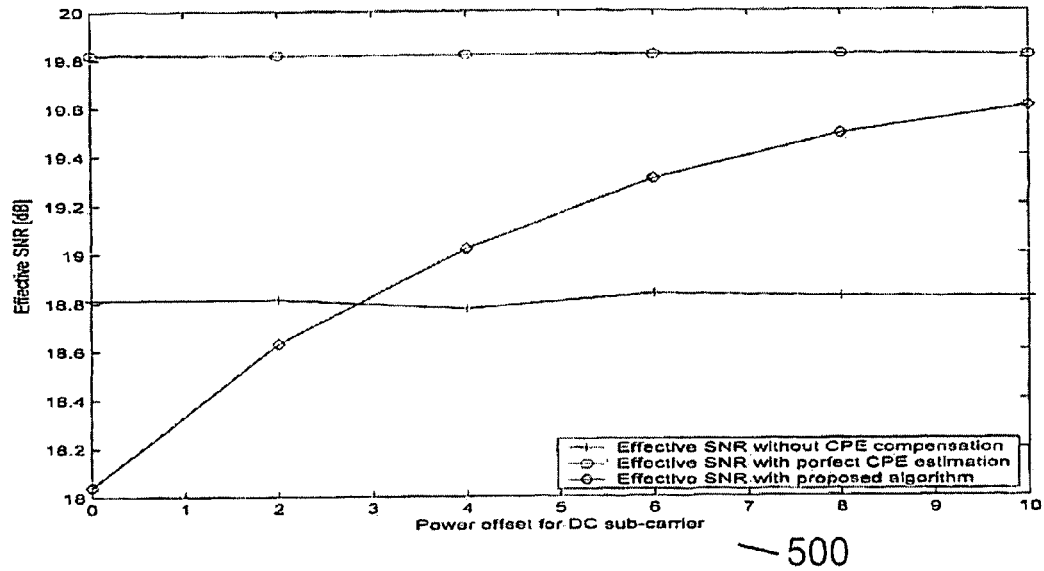
FIG. 5 is a graph illustrating the effective signal to noise ratio (SNR) as a function of power offset, where phase noise level (PNL)=−60 dBc/Hz, the cut-off frequency (Fc)=1 kHz and SNR=20 dB.

FIG. 5 is a graph 500 illustrating the effective signal to noise ratio (SNR) as a function of power offset, where phase noise level (PNL)=−60 dBc/Hz, the cut-off frequency (Fc)=1 kHz and SNR=20 dB.

Figure 6:
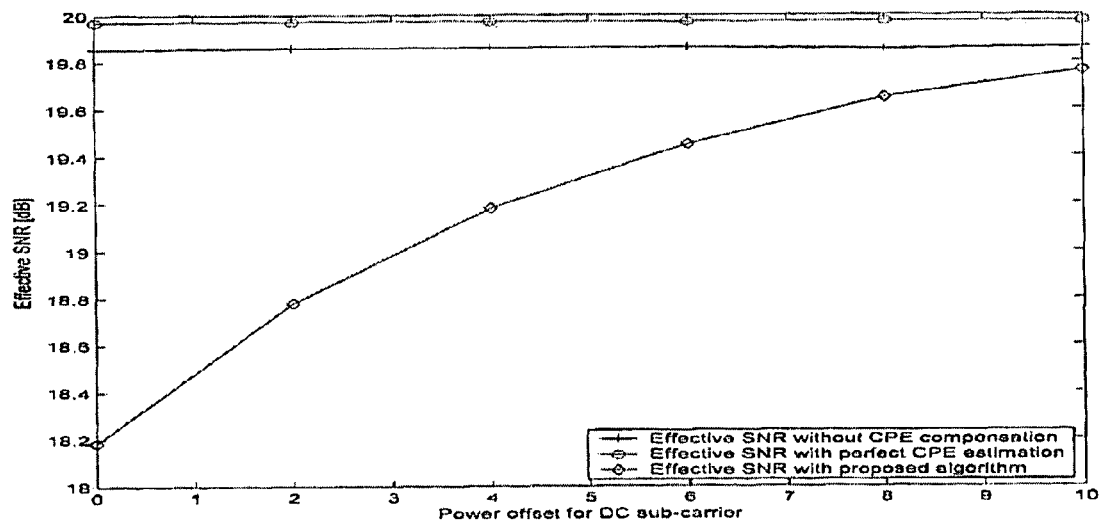
FIG. 6 is a graph illustrating the effective SNR as a function of power offset, where PNL=−70 dBc/Hz, Fc=1 kHz and SNR=20 dB.

FIG. 6 is a graph 600 illustrating the effective SNR as a function of power offset, where PNL=−70 dBc/Hz, Fc=1 kHz and SNR=20 dB.

Figure 7:
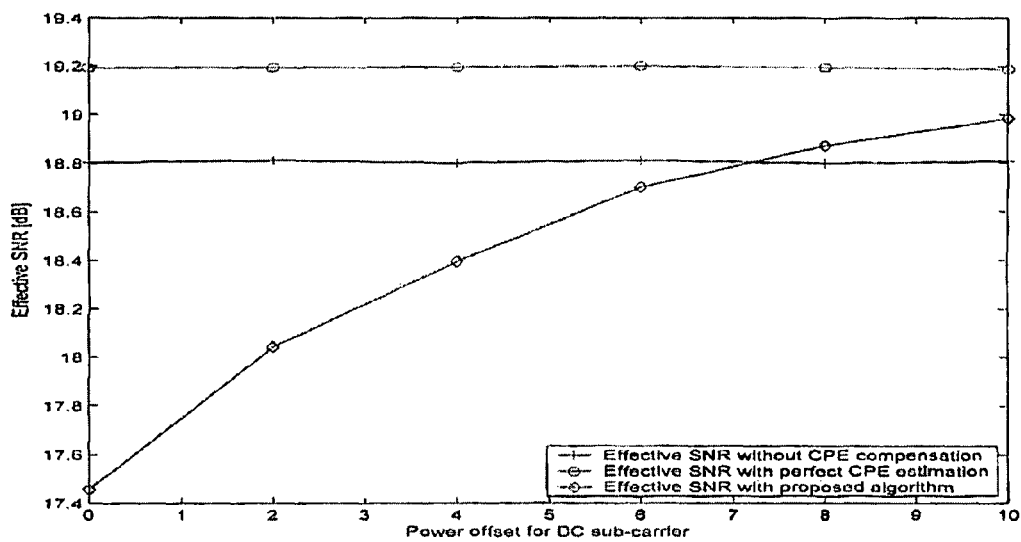
FIG. 7 is a graph illustrating the effective SNR as a function of power offset, where PNL=−70 dBc/Hz, Fc=10 kHz and SNR=20 dB.

FIG. 7 is a graph 700 illustrating the effective SNR as a function of power offset, where PNL=−70 dBc/Hz, Fc=10 kHz and SNR=20 dB.

Figure 8:
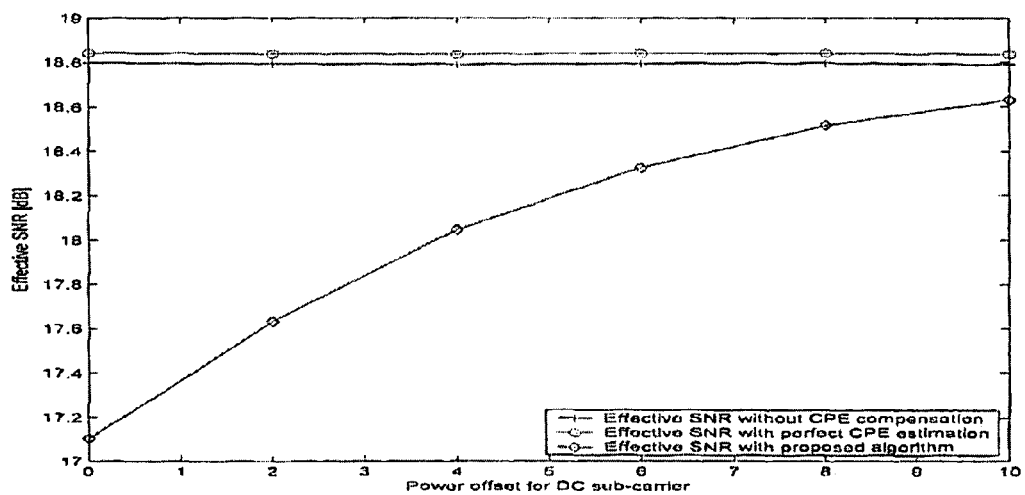
FIG. 8 is a graph illustrating the effective SNR as a function of power offset, where PNL=−80 dBc/Hz, Fc=100 kHz and SNR=20 dB.

FIG. 8 is a graph 800 illustrating the effective SNR as a function of power offset, where PNL=−80 dBc/Hz, Fc=100 kHz and SNR=20 dB.

Figure 9:
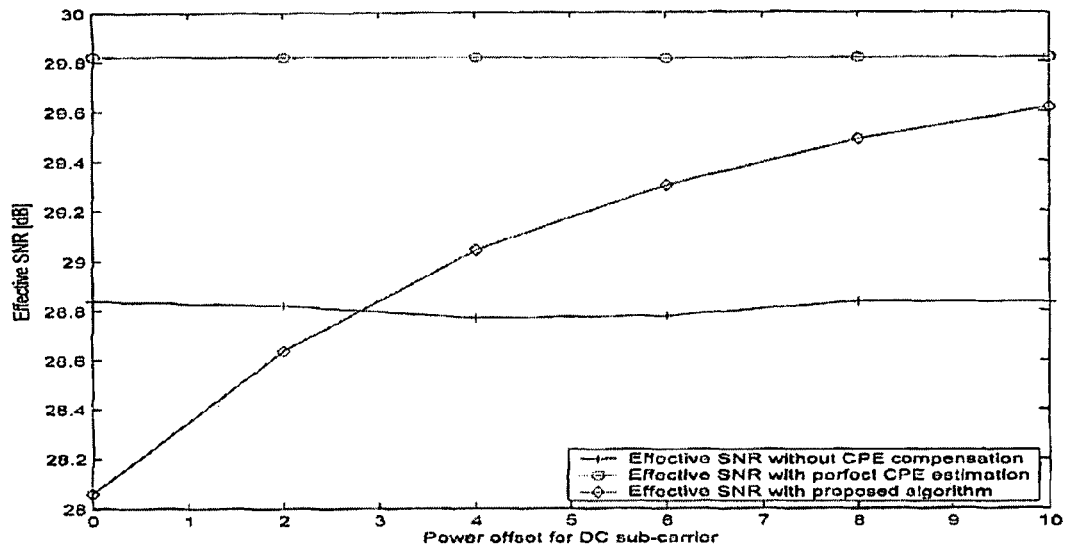
FIG. 9 is a graph illustrating the effective SNR as a function of power offset, where PNL=−70 dBc/Hz, Fc=1 kHz and SNR=30 dB.

FIG. 9 is a graph 900 illustrating the effective SNR as a function of power offset, where PNL=−70 dBc/Hz, Fc=1 kHz and SNR=30 dB.

Figure 10:
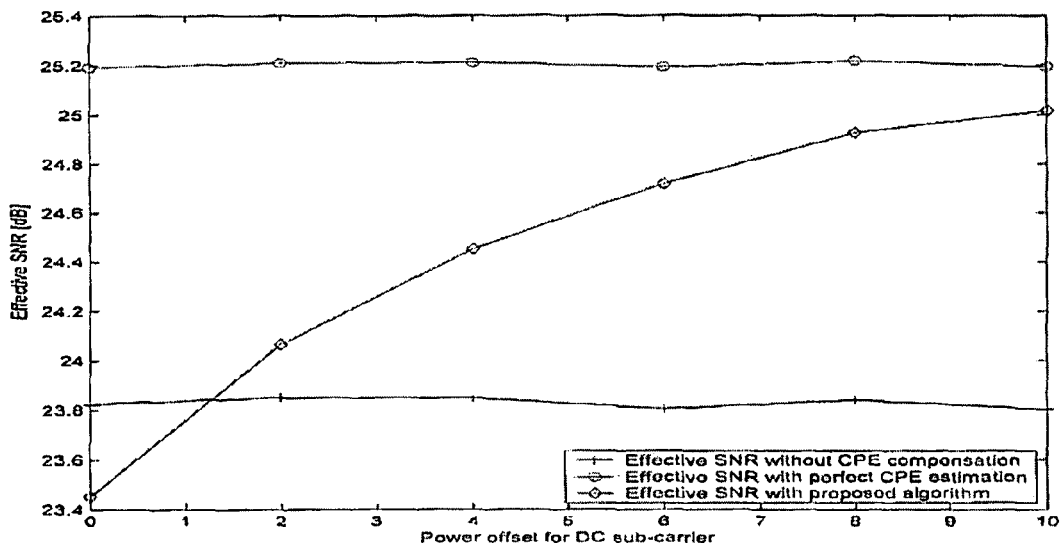
FIG. 10 is a graph illustrating the effective SNR as a function of power offset, where PNL=−70 dBc/Hz, Fc=10 kHz and SNR=30 dB.

FIG. 10 is a graph 1000 illustrating the effective SNR as a function of power offset, where PNL=−70 dBc/Hz, Fc=10 kHz and SNR=30 dB.

Figure 11:
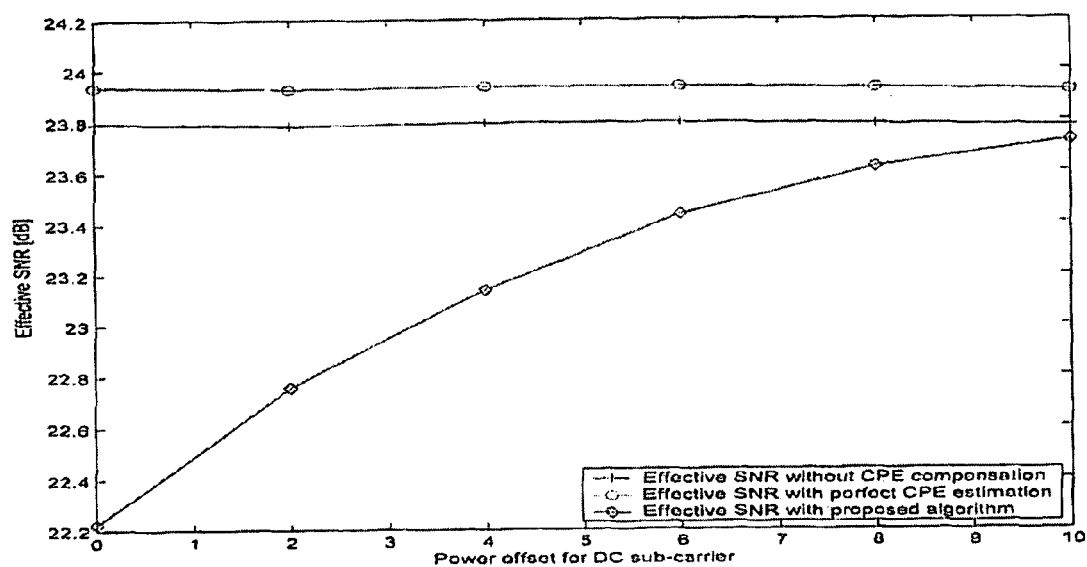
FIG. 11 is a graph illustrating the effective SNR as a function of power offset. PNL=−80 dBc/Hz, Fc=100 kHz, SNR=30 dB.

FIG. 11 is a graph 1100 illustrating the effective SNR as a function of power offset. PNL=−80 dBc/Hz, Fc=100 kHz, SNR=30 dB.

Referring to FIGS. 5 to 11, it can be seen that under certain conditions, it is beneficial to have a power level of the DC sub-carrier that is adapted based on the transmission format, such as modulation scheme and coding rate. Further, it can be seen that in some cases, there is little benefit in estimating the CPE, and if used with a DC sub-carrier at too low power, the performance is degraded.

In some cases the CPE may be the result of imperfections in the receiver. For example, with reference to the downlink in a cellular system, it can usually be assumed that a base station is able to provide a more accurate frequency generation than a mobile terminal. In case the power level of the CPE is very different for different mobile terminals, it might therefore be beneficial for the mobile terminal to feed back information to the base station so that a proper level of the DC sub-carrier is determined and transmitted.

In another situation, a mobile terminal may have frequency generation that is so accurate that phase noise is not an issue, in which case the base station would not transmit anything at all on the DC sub-carrier. In this way, the system is able to use the total available output power as efficiently as possible.

In yet another situation, it might be that the mobile terminal has a frequency generation circuitry that results in significant phase noise. If this is the case, the base station would transmit a signal on the DC sub-carrier in order to allow for efficient CPE estimation.

It is noted that reference symbols typically are available in some of the OFDM systems in order to aid, among other things, channel estimation. In 3G LTE for example, the OFDM symbols are transmitted in sub-frames that contain 7 OFDM symbols. Two of these contain reference symbols. In another embodiment of the present invention, a reference symbol is therefore transmitted on the DC sub-carrier for those OFDM symbols that do not contain any other reference symbols.

It is further noted that the spectrum of the signal transmitted on the DC sub-carrier should preferably have most of its energy as far as possible from DC in order that it not be attenuated in the event DC filtering is used in the receiver to remove DC leakage caused in the receiver. This would be achieved by, inter alia, having an alternating sequence with the average being zero. In this way a strong spectrum component of the DC sub-carrier will be located at half the sub-carrier spacing, i.e., as far away from the DC sub-carrier as possible.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method of reducing phase noise from a multi-carrier modulation (MCM) system, comprising the steps of:
    determining low frequency phase noise by determining the variance of common phase error (CPE);
    determining how much CPE would cause an overly degraded level of performance;
    generating known data; and
    based on the level of CPE that would cause an overly degraded level of performance, transmitting the known data on a sub-carrier at a power level necessary to allow for accurate CPE estimation, wherein the sub-carrier is a DC sub-carrier.

2. The method of claim 1, wherein the MCM system is an orthogonal frequency division multiplexing (OFDM) system.

3. The method of claim 2, wherein the OFDM system is one of a 3G LTE, WiMAX or WLAN system.

4. The method of claim 2, wherein the spectrum of a signal transmitted on the DC sub-carrier has substantially all of its energy away from DC.

5. The method of claim 1, wherein the power level of the DC sub-carrier is based on the transmission format, including modulation scheme and coding algorithm.

6. The method of claim 1, further comprising the step of transmitting by a mobile terminal to a base station information adapted to allow the base station to determine and transmit a proper level of the DC sub-carrier.

7. The method of claim 1, further comprising the step of transmitting, by a base station, a signal on the DC sub-carrier in order to allow for efficient CPE estimation.

8. An apparatus for reducing phase noise from a multi-carrier modulation (MCM) system, comprising:
    means for determining low frequency phase noise by determining the variance of the common phase error (CPE);
    means for determining how much CPE would cause an overly degraded level of performance;
    means for generating known data; and
    means for transmitting, based on the level of CPE that would cause an overly degraded level of performance, the known data on a sub-carrier at a power level necessary to allow for accurate CPE estimation, wherein the sub-carrier is a DC sub-carrier.

9. The apparatus of claim 8, wherein the power level of the DC sub-carrier is based on the transmission format, including modulation scheme and coding algorithm.

10. The apparatus of claim 9, wherein the MCM system is an orthogonal frequency division multiplexing (OFDM) system, wherein the OFDM system is one of a 3G LTE, WiMAX or WLAN system.

11. The apparatus of claim 8, further comprising means of transmitting, by a mobile terminal to a base station, information adapted to allow the base station to determine and transmit a signal on the DC sub-carrier at an appropriate power level.

12. The apparatus of claim 8, further comprising means of transmitting, by a base station, a signal on the DC sub-carrier in order to allow for efficient CPE estimation.

13. The apparatus of claim 12, wherein the spectrum of the signal transmitted on the DC sub-carrier has substantially all of its energy away from DC.

* * * * *

UNITED STATES PATENT AND TRADEMARK OFFICE
CERTIFICATE OF CORRECTION

| | | |
|---|---|---|
| PATENT NO. | : 7,894,540 B2 | Page 1 of 1 |
| APPLICATION NO. | : 11/877894 | |
| DATED | : February 22, 2011 | |
| INVENTOR(S) | : Wilhelmsson et al. | |

It is certified that error appears in the above-identified patent and that said Letters Patent is hereby corrected as shown below:

Title Page, Item (56), under "OTHER PUBLICATIONS", delete "Communicalions" and insert -- Communications --, therefor.

In Column 3, Line 58, delete "DRAWING" and insert -- DRAWINGS --, therefor.

In Column 5, Line 39, delete " $\mathrm{sinc}^2(f/f_u)|\Phi(f-mf_u|^2 df.$ " and insert -- $\mathrm{sinc}^2(f/f_u)|\Phi(f-mf_u)|^2 df.$ --, therefor.

Signed and Sealed this
Seventeenth Day of May, 2011

David J. Kappos
*Director of the United States Patent and Trademark Office*